INVENTOR
FRANK B. HARLEY
BY
Holcombe, Wasserman & Brisbois
ATTORNEYS

United States Patent Office 3,408,702
Patented Nov. 5, 1968

3,408,702
CONNECTOR DEVICES
Frank Bernard Harley, Egham, England, assignor to Harley Patents (International) Limited, Egham, England
Original application Feb. 15, 1965, Ser. No. 432,784, now Patent No. 3,335,468, dated Aug. 15, 1967. Divided and this application June 1, 1967, Ser. No. 642,805
Claims priority, application Great Britain, Feb. 24, 1964, 7,617/64
6 Claims. (Cl. 24—128)

ABSTRACT OF THE DISCLOSURE

This invention provides a connector device by means of which a cord, rope, chain, wire or the like may be simply connected to another part and the specification specifically discloses two constructions each of which comprises a flat plate having a relatively flat abutment support connected to it for movement between normal and displaced positions, the abutment support having in it a slot, and the plate a hole, the slot and hole only partially overlying one another so that by insertion of, for example, a knot on a cord upwards through the aperture with the abutment support in the displaced position the run of the cord can then be sild down the slot of the abutment support whereafter the abutment support can return to the normal position at which time the knot is prevented from passing back through the slot and hence prevented from passing back through the aperture.

---

Figures 1, 2:
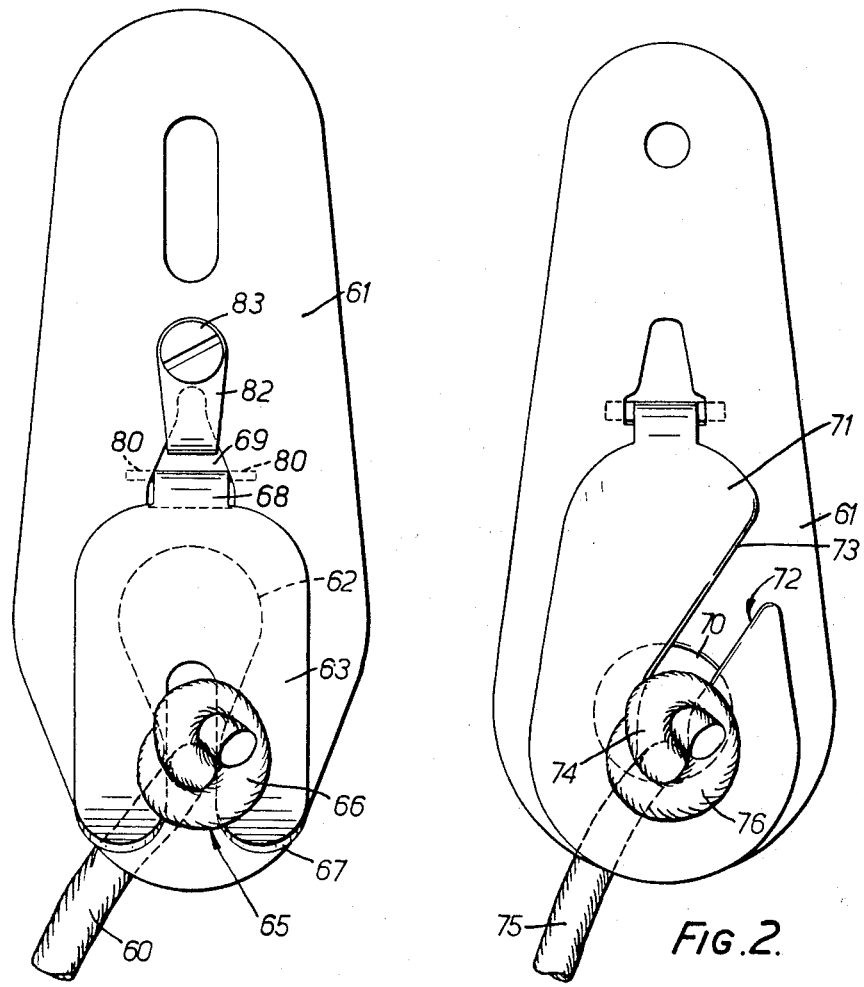

This application is a division of my prior application Serial No. 432,784 filed February 15, 1965, now U.S. Patent No. 3,335,468.

This invention relates to connector devices suitable for connecting to another object a part such as a cord, rope, chain, wire or the like having an abutment thereon.

The object of the invention is to provide such a construction of an extremely simple and inexpensive nature having a minimum of moving parts.

According to one aspect of the present invention a connector device comprises a generally flat body affording first and second opposite faces, a first abutment on said body by means of which it may be attached to another object, an aperture in said body spaced from said first abutment and extending through the body between the first and second faces, an abutment support for a second abutment which abutment support is adapted to lie, in a normal position, substantially flat upon the said second face of the body, co-operating interconnecting means formed on the body and abutment support respectively, said interconnecting means being arranged normally to prevent complete separation of the body and abutment support but permitting relative movement thereof to a relatively displaced position, said abutment support affording a slot which in the said normal position partially overlies the aperture in the body, the slot in the displaced position being spaced from the aperture to permit an abutment on another part to be passed through the aperture from the first face of the body and co-operatively engaged with the margins of the slot remote from the body whereby the abutment is prevented from passing back through the aperture when the body and abutment support are returned to the normal position.

Specifically the invention provides a connector device comprising a generally flat body affording first and second opposite faces, a first abutment on said body by means of which it may be attached to another object, an aperture in said body spaced from said first abutment and extending through the body between the first and second faces, an abutment support for a second abutment which abutment support is adapted to lie in a normal position, substantially flat upon the said second face of the body, co-operating interconnecting means formed on the body and abutment support respectively, said interconnecting means being arranged normally to prevent complete separation of the body and abutment support but permitting relative movement thereof to a relatively displaced position, the said abutment support having a slot extending from an edge region thereof, which edge region does not overlie the said aperture in the said normal position of the abutment support, but the slot having a portion thereof which does so overlie said aperture in said normal position in order that another part may be inserted through the aperture from the first face of the body when said abutment support and body are in their relatively displaced position and thereafter slid into said portion of the slot, and after the return of the said abutment support and body to said normal position and abutment on said other part which has at least one dimension greater than the width of said portion will be prevented from passing back through said aperture.

The invention may be carried into practice in a number of ways but several specific embodiments will now be described by way of example with reference to the accompanying drawings in which:

FIGURE 1 shows a device for connecting a cord, rope, chain or the like to another part in this case connected to a nylon cord, and FIGURE 2 shows a modified device.

FIGURE 1 illustrates an embodiment in which a knotted cord 60 (or a cable or chain or the like) can be simply connected to a plate 61. In this case the plate 61 has in it a generally pear-shaped opening 62 overlying which is a U-shaped retaining member 63.

The retaining member 63 has a projecting portion 68 which extends through a slot 69 in the plate 61. The projecting portion 68 is provided with turned back lugs 80 on the reverse side of the plate 61 to prevent the retaining member 63 being detached. In practice the slot 69 is long enough to enable the retaining member 63 to be released by turning through 90° at which time the lugs 80 can pass up through the plate 61. This is normally prevented, however, by a retainer hook 82 which partially overlies and extends into the slot 69 and which is secured to the plate 61 by a screw 83. However, the retainer hook 82 permits considerable freedom of movement of the retaining member 63 so that it can be hinged upwards from the plane of FIGURE 1 and it can also be twisted slightly if desired.

The retaining member 62 affords a slot 65 which overlies part of the narrow end of the pear-shaped opening 62 in the plate 61. The slot 65 however, is of limited length so that a tension in the cord 60 causes its knot 66 to bear on the sides of the retaining member 63 in turn causing this to bear on the surface of the plate 61. Accordingly in this embodiment the cord is secured to the plate 61 by lifting the retaining member 63 by means of upturned finger pieces 67 until the knot 66 can be passed through the wide end of the pear-shaped opening 62 and then slipped over the top of the retaining member 63 to the position shown. The upward and downward movement of the retaining member is permitted by the parts 68, 69, and 80.

In the embodiment of FIGURE 2 a construction similar to that of FIGURE 1 is shown but in this case the plate 61 merely has a circular opening 70 and the retaining member 71 has in it a generally L-shaped slot 72 having a long arm 73 extending obliquely to the length of the plate 61 and a short arm 74 which overlies the opening 70. In this embodiment therefore the cord 75 with its knot 76 is passed through the opening 70 whilst the retaining member 71 is raised. The knot is then brought over the top of the retaining member 71 and the run of the cord slipped down the slot 72 until the knot overlies the short arm 74. Thereafter a tension in the cord 75 will maintain the retaining member 71 flat against the plate 61 and prevent release of the cord.

What I claim as my invention and desire to secure by Letters Patent is:

1. A connector device comprising a generally flat plate affording first and second opposite faces, a first abutment on said plate by means of which it may be attached to another object, an aperture in said plate spaced from said first abutment and extending through the plate between the first and second faces, an abutment support for a second abutment, co-operating interconnecting means formed on the plate and abutment support respectively, said interocnnecting means being arranged normally to prevent complete separation of the plate and abutment support but permitting relative movement in a plurality of planes to a relatively displaced position, said abutment support lying, when in a normal position, substantially flat upon the second face of the plate and being supported thereby between said connecting means and said aperture, and affording a slot which in the said normal position partially overlies the aperture in the plate, the slot in the displaced position being spaced from the aperture to permit an abutment on another part to be passed through the aperture from the first face of the plate and co-operatively engaged with the margins of the slot remote from the plate whereby the abutment is prevented from passing back through the aperture when the plate and abutment support are returned to the normal position.

2. A connector device as claimed in claim 1 wherein the aperture is generally pear-shaped in order to afford a wide end and a narrow end and the slot overlies only the narrow end of the aperture when the abutment support is in the normal position.

3. A connector device as claimed in claim 1 in which the abutment support comprises a substantially flat member arranged in the said normal position to lie flat on said plate, said flat member having at least one offset portion to afford a lifting shoulder.

4. A connector device as claimed in claim 3 wherein the said flat member has a pair of offset portions to afford two lifting shoulders one being situated on each side of the slot.

5. A connector device comprising a generally flat plate affording first and second opposite faces, a first abutment on said plate by means of which it may be attached to another object, an aperture in said plate spaced from said first abutment and extending through the plate between the first and second faces, an abutment support for a second abutment, co-operating interconnecting means formed on the plate and abutment support respectively, said interconnecting means being arranged normally to prevent complete separation of the plate and abutment support but permitting relative movement thereof in a plurality of planes to a relatively displaced position, said abutment support lying, when in a normal position, substantially flat upon the second face of the plate and being supported thereby between said connecting means and said aperture, and having a slot extending from an edge region thereof, which edge region does not overlie the said aperture in the said normal position of the abutment support, but the slot having a portion thereof which does so overlie said aperture in said normal position in order that another part may be inserted through the aperture from the first face of the plate when said abutment support and plate are in their relatively displaced position and thereatfer slid into said portion of the slot, and after the return of the said abutment support and plate to said normal position an abutment on said other part which has at least one dimension greater than the width of said portion will be prevented from passing back through said aperture.

6. A connector device as claimed in claim 5 in which said edge region of the slot lies closer to the said interconnecting means than the aperture when said abutment support is in its normal position.

References Cited
UNITED STATES PATENTS

| | | | |
|---|---|---|---|
| 266,587 | 10/1882 | Eastburn | 24—128.1 |
| 395,742 | 1/1889 | Conkey | 24—116 |
| 404,615 | 6/1889 | Giroux | 24—116 |
| 1,107,126 | 8/1914 | Wilson | 24—223 X |
| 1,322,747 | 11/1919 | Axe | 24—116 X |
| 1,373,349 | 3/1921 | Peardon | 24—116.1 |
| 2,624,086 | 1/1953 | Schaefer | 24—123.1 |

BERNARD A. GELAK, *Primary Examiner.*